（12）United States Patent
Hughes

(10) Patent No.: US 9,382,398 B1
(45) Date of Patent: *Jul. 5, 2016

(54) COMPOSITE MEMBERS AND METHODS FOR PRODUCING SAME

(71) Applicant: Roderick E. Hughes, Newport Beach, CA (US)

(72) Inventor: Roderick E. Hughes, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,736

(22) Filed: May 20, 2015

(51) Int. Cl.
| | |
|---|---|
| *C08J 9/06* | (2006.01) |
| *E04B 1/00* | (2006.01) |
| *E04F 11/18* | (2006.01) |
| *B29C 44/12* | (2006.01) |
| *E06B 9/24* | (2006.01) |
| *C08J 9/00* | (2006.01) |
| *C08K 7/14* | (2006.01) |
| *B32B 5/18* | (2006.01) |
| *B32B 27/06* | (2006.01) |
| *B32B 27/30* | (2006.01) |
| *B29L 31/00* | (2006.01) |

(52) U.S. Cl.
CPC . *C08J 9/06* (2013.01); *B29C 44/12* (2013.01); *B32B 5/18* (2013.01); *B32B 27/065* (2013.01); *B32B 27/304* (2013.01); *C08J 9/009* (2013.01); *C08J 9/0085* (2013.01); *C08K 7/14* (2013.01); *E04B 1/003* (2013.01); *E04F 11/18* (2013.01); *E06B 9/24* (2013.01); *B29L 2031/719* (2013.01); *B29L 2031/772* (2013.01); *B32B 2262/101* (2013.01); *B32B 2264/104* (2013.01); *B32B 2264/12* (2013.01); *C08J 2327/06* (2013.01); *E04F 2011/1897* (2013.01)

(58) Field of Classification Search
CPC ............... C08J 9/0066; Y10T 428/249986; Y10T 428/249991; Y10T 428/249992
See application file for complete search history.

(56) References Cited

U.S. PATENT DOCUMENTS

| | | | |
|---|---|---|---|
| 4,455,398 A | 6/1984 | Budich et al. | |
| 4,514,449 A | 4/1985 | Budich et al. | |
| 4,722,943 A | 2/1988 | Melber et al. | |
| 4,769,391 A | 9/1988 | Wycech | |
| 4,843,104 A | 6/1989 | Melber et al. | |
| 5,100,109 A | 3/1992 | Robbins, III | |
| 5,404,685 A | 4/1995 | Collins | |
| 5,518,677 A | 5/1996 | Deaner et al. | |
| 5,858,522 A | 1/1999 | Turk et al. | |
| 5,886,078 A | 3/1999 | Sullivan et al. | |
| 5,891,553 A | 4/1999 | Hendrix et al. | |
| 6,054,207 A | 4/2000 | Finley | |
| 6,106,944 A | 8/2000 | Heikkila et al. | |
| 6,494,438 B1 | 12/2002 | Noirot et al. | |

(Continued)

*Primary Examiner* — Hai Vo
(74) *Attorney, Agent, or Firm* — Stout, Uxa & Buyan, LLP; Carlos A. Fisher

(57) ABSTRACT

New composite members, for example, useful in decks or decking systems, rail or railing systems and window-coverings or blinds and the like, as well as methods for producing the same or like items have been discovered. The composites or composite members are easy to manufacture in a variety of configurations using relatively inexpensive materials. In addition, the composites are sturdy, lightweight and have excellent weatherability properties. In addition, the composites or composite members have many of the desirable properties of natural wood products such as fences and decks and railings. For example, the composites of the invention can be made to have a wood-like look and texture, for example, without having any wood content. Moreover, unlike solid wood fences and decks, the composites of the present invention preferably are highly resistant to effects of weathering.

16 Claims, 1 Drawing Sheet

(56) References Cited

U.S. PATENT DOCUMENTS

| | | |
|---|---|---|
| 6,497,956 B1 | 12/2002 | Phillips et al. |
| 6,749,709 B1 | 6/2004 | Krishnawswamy et al. |
| 6,827,995 B2 | 12/2004 | Hughes et al. |
| 6,890,965 B1 | 5/2005 | Johnson et al. |
| 2003/0082338 A1 | 5/2003 | Baker |
| 2003/0148685 A1 | 8/2003 | Bracegirdle |
| 2003/0198780 A1 | 10/2003 | Campese et al. |
| 2004/0112465 A1 | 6/2004 | Jones |
| 2004/0126515 A1 | 7/2004 | Yarmoska |
| 2004/0126568 A1 | 7/2004 | Deaner et al. |
| 2005/0143508 A1 | 6/2005 | Tyagi et al. |
| 2005/0227022 A1 | 10/2005 | Domine et al. |
| 2005/0255305 A1 | 11/2005 | Jo et al. |
| 2006/0133900 A1 | 6/2006 | Singleton |
| 2006/0246272 A1 | 11/2006 | Zhang et al. |
| 2007/0078191 A1* | 4/2007 | Guhde et al. .............. 521/99 |
| 2007/0092707 A1 | 4/2007 | Anderson et al. |
| 2007/0148429 A1 | 6/2007 | McGrath et al. |
| 2008/0118728 A1 | 5/2008 | Magley et al. |
| 2008/0213562 A1 | 9/2008 | Przybylinski et al. |
| 2011/0067349 A1 | 3/2011 | Michaud |
| 2012/0077890 A1 | 3/2012 | Mancosh et al. |
| 2012/0328823 A1 | 12/2012 | Monteer |
| 2013/0240162 A1 | 9/2013 | Rubinoff |
| 2014/0199514 A1 | 7/2014 | Carlson et al. |

* cited by examiner

COMPOSITE MEMBERS AND METHODS FOR PRODUCING SAME

BACKGROUND OF THE INVENTION

The present invention generally relates to compositions, pellets and composite members made therefrom and more specifically relates to composite members useful as or in the form of deck elements, window blind (covering) elements, rail (railing) elements, and the like, and methods for producing same.

Traditionally, decks, window blinds and railing systems have been made of components fashioned from solid wood. Such wood elements are often considered more aesthetically appealing than those made of metal or cement. However, construction of wood decks or wood window blinds (window coverings) or wood railing systems is labor intensive. Solid wood components are heavy and cumbersome. In addition, maintenance of wood decks, blinds or railings is expensive.

After a period of time, solid wood components naturally begin to break down from weather and/or light exposure and/or pest infestations. It is known that this deterioration can be tempered by treating such wood components with widely available weather resistant coatings, paints, varnishes, finishes and the like. Unfortunately however, it is often only a matter of time before such treated wood components deteriorate requiring partial or complete replacement.

In addition, solid wood materials that are suitable for decks, window blinds and rails are costly. Also, because of natural variations in wood, replacement of individual components may result in an inconsistent, uneven appearance to the deck, window blinds or railing system.

Plastic components have been developed as alternatives or supplements to traditional, natural wood structures.

For example, U.S. Patent Publication No. 2007/0148429 (McGrath et al) discloses tri-extruded thermoplastic profiles which are reinforced and not homogeneous. This publication discloses a first polymeric composition in the form of a structural frame including: reinforcing fibers coated with a sizing composition that contains a film forming agent, a coupling agent, a lubricant, and one or more additives. A second polymeric composition fills the recess of the structural frame and a third polymeric composition is a cap or coating. The polymers used may include high density polyethylene (HDPE).

The second polymeric composition may be a foamed composition or filler. The reference discloses that the addition of wet use chopped strand (WUCS) fiberglass may enhance strength of the foamed composition; and that wood flour (WF) may be used in any of the three polymeric compositions.

McGrath et al does not disclose that the finished profiles may be used for decking and fence railing; see paragraphs [0037] and [0087]-[0080].

McGrath et al implies, at paragraph [0102] that the incorporation of glass fiber into foamed boards does not successfully improve their mechanical properties due to insufficient adhesion of the glass fibers with the polymeric materials. The reference purports to overcome this problem with the use of a size composition and WUCS.

U.S. Patent Publication No. 2003/0082338 (Baker) discloses a composite material comprising a thermoplastic polymer, for example, polyethylene, and a fiber material, for example, wood.

Baker discloses that the composite material contains about 40% to about 70%, preferably about 50%, by weight, of the fiber material. Baker does not disclose the use of fiberglass.

U.S. Patent Publication No. 2012/0077890 (Mancosh et al) discloses composite profiles made using recycled carpet waste, including carpet fibers and adhesive, and fly ash. Mancosh et al discloses that carpet waste is an essential ingredient in the composites of this reference. Mancosh et al discloses that wood fiber and fiberglass fibers may optionally be used. The compositions may also contain a base polymer, which may comprise HDPE. In other embodiments no base polymer is included.

U.S. Patent Publication No. 2003/0198780 (Campese et al) discloses a pultruded composite comprising a matrix and coated hollow microspheres. Campese et al discloses that the composite may be reinforced with fiberglass mat. The composite may include polyethylene or "vinyl" and wood fibers may be present. Campese et al does not disclose extruded products or extrusion; and also does not disclose foamed composites.

Other references include: U.S. Patent Publication No. 2004/0126515 (Yarmoska); U.S. Pat. No. 5,100,109 (Robbins, III); U.S. Pat. No. 5,404,685 (Collins); U.S. Pat. No. 6,827,995 (Hughes et al); and U.S. Pat. No. 6,890,965 (Johnson et al).

There still remains a need in the market today for inexpensive, lightweight decking components, window coverings, and rail components that are sturdy, weather resistant, lightweight, and aesthetically appealing, and easy to manufacture using simple manufacturing techniques. Further, there remains a need for compositions, including pellets and formulations for making such components, and coverings.

SUMMARY OF THE INVENTION

New composite members, for example, useful in decking elements or decking systems, rail elements or railing systems, and window coverings or blinds, and the like, as well as compositions and methods for producing the same or like items have been discovered. The present composite members are easy to manufacture in a variety of configurations using relatively inexpensive and readily available materials. In addition, the composite members are both sturdy and lightweight compared to solid wood elements, and have excellent weatherability properties. The present composite members have many of the desirable properties of natural wood products such as decks, window blinds (coverings) and railings, including fences. The composites and composite members of the invention can be made to have a wood-like look and texture, for example, without having any wood content. Moreover, unlike solid wood elements, the composites and composite members of the present invention preferably are highly resistant to effects of weathering, for example, are weatherable. In other examples, such composites and component members may comprise a wood or other filler.

Methods for producing composite members are provided, as are compositions, including, without limitation, fused and compacted pellets, for making the same.

In one example, such a method comprises forming a mixture comprising polyvinyl chloride (PVC), for example, at least about 40% or at least about 45%, or at least about 50% by weight of PVC, and chopped fiberglass component. The fiberglass component is selected from the group consisting of chopped fiberglass mat, chopped fiberglass strand, and mixtures thereof in an amount equal to or less than about 20% by weight of the total mixture, the mixture being substantially free of carpet waste; and processing the mixture to produce the composite member. By "chopped fiberglass mat" is meant is meant fragments of a mat comprised of glass fibers treated with a silane coupling agent and said treated glass fibers laid randomly across one another and held together with a binder to form a planar glass fiber sheet having multidmensional strength within the plane. As intended in this application the term "fiberglass component", when used to refer to the present invention (and the mat and/or strand comprising it) shall, unless specifically excluded, always include a coupling agent, such as a coating comprising a coupling agent. The composite member has increased strength relative to a reference composite member produced by identically processing an identical mixture without the chopped fiberglass component.

The processing may include any suitable step or steps effective to produce the composite member. In one example, the processing comprises extruding the mixture. The processing may preferably comprise foaming the mixture, for example, to form a substantially homogeneous foamed composite.

Compositions of the present invention may comprise fused or compacted pellets, or powered, chopped or granulated compositions to be used in formulating and forming the composites and components described herein.

The method may further comprise applying a weatherable cap to the composite member.

In one example, the method further comprises forming the composite member into a shape of one of a decking element, a window blind element (a window covering element) or a rail element (an element of a railing assembly).

In one example, a deck is provided comprising a plurality of composite members, as described herein, in combination. For example, the composite members, each in the form of a decking element, may be linked, secured or otherwise used, together to form a deck.

A window blind, for example, a window covering, may be provided comprising a plurality of composite members, as described herein. For example, the plurality of composite members, each in the form of a window blind element, may be linked together, for example, in a conventional manner, to form a window blind or window covering.

One or more elements of a rail (railing) system, for example, a rail system (e.g., rail posts, balusters and/or railings) for a stair case, a swimming pool, a walk way and the like, may be provided comprising a plurality of composite members in the form of railing elements, as described herein. For example, the composite members, each in the form of a railing element, may be linked or otherwise used together to form a railing system.

Various examples and embodiments of the present invention are described in detail in the detailed description and claims herein. Any feature or combination of features described herein are included within the scope of the present disclosure provided that the features included in any such combination are not mutually inconsistent as will be apparent from the context, this specification, and the knowledge of one of ordinary skill in the art. In addition, any feature or combination of features may be specifically excluded from any example or embodiment of the present disclosure. Additional advantages and examples are apparent in the following detailed description, claims and drawings in which like parts bear like reference numbers.

DETAILED DESCRIPTION

Figure 1:
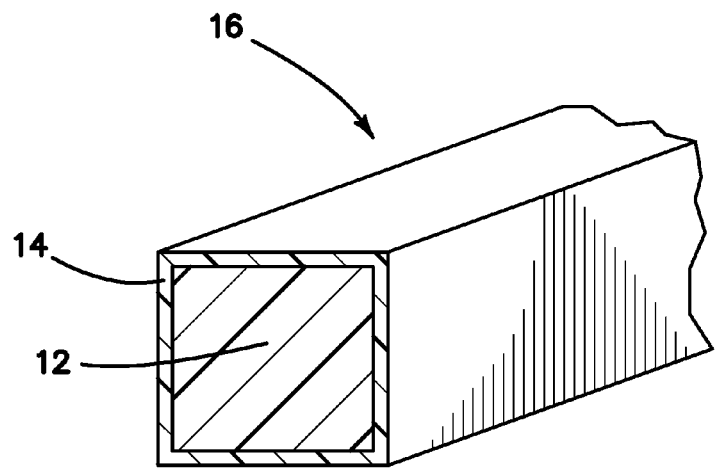
FIG. 1 is a cross-section view, in perspective, of a composite member of the present invention in the form of a rail post.
Figure 2:
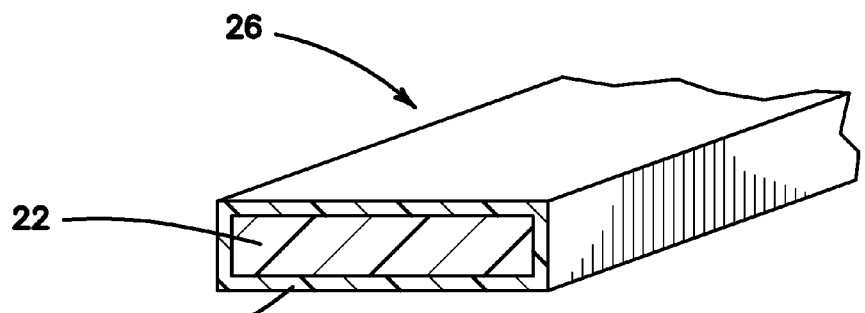
FIG. 2 is a cross-section view, in perspective, of a composite member of the present invention in the form of a decking board.
Figure 3:
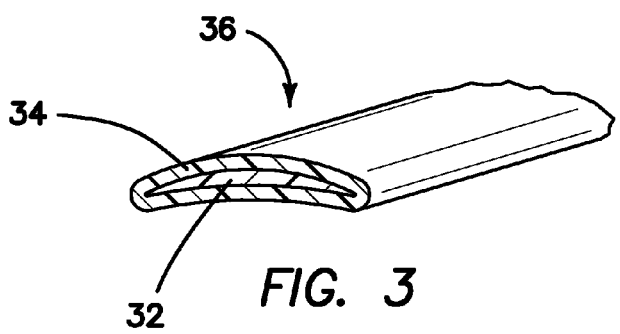
FIG. 3 is a cross-section view, in perspective, of a composite member of the present invention in the form of a window blind element.

The present composite members and/or materials may be used in various forms, to form, for example, structural materials or articles such as decking elements, rail or railing elements, window coverings and the like. The present composite members/compositions may be weatherable, strong and impact resistant.

As used herein, the term "weatherable" refers to the ability or property of a material, such as a composite member, to effectively withstand the conditions of an out-of-doors environment over a long period of time, for example, at least five years and preferably at least seven years, with substantially no degradation, decomposition, and/or loss of structural strength.

In one example, the present composite members, such as decking elements, rail (or railing) elements, window covering or window blind elements, are substantially resistant to the effects of outdoor weather on a long term basis and, therefore, can be employed out-of-doors. The present composite members can be molded, pressed extruded and/or otherwise formed into shapes and configurations useful in producing finished product articles. Such finished product articles can include only the compositions of the present invention; other examples may include combinations of the present composite members (compositions) with other materials. In one example, certain of the compositions from which the present composite members are made, or other suitable compositions, in accordance with the present invention may be used to apply a cap to the finished article, such as (without limitation) through a co-extrusion process. Preferably, the cap is between about 1/16 inch and about 1/4 inch thick, such as up to about 1/8" thick, do not comprise fiberglass, and/or are unfoamed.

In one example, one or more composite members are provided comprising a foamed composition, for example, a substantially homogenous foamed composition, comprising PVC; chopped fiberglass mat in an amount less than about 20% by weight of the composition and being effective to increase the strength of the foamed composition and/or composite member. The present composite members may be substantially free of carpet waste. In one example, the present composite members may be substantially free of hollow microspheres (other than those used in foaming components).

The present composite members are preferably foamed and may be manufactured or otherwise provided and/or used in any suitable form. For example, and without limitation, the present composite members may be in the form of a decking element, a window blind or window covering element, a rail element (such as a baluster), that is at least one element of a railing system or assembly, and the like.

In one example, the chopped fiberglass component of the present composite members provides increased or added strength to the composite members. This is surprising since it has been believed that fiberglass, even relatively large amounts, for example, about 30% by weight or more, of fiberglass, did not substantially increase the strength of hydrocarbon polymer-containing articles containing such relatively large amounts of fiberglass.

Furthermore, it was previously thought that the addition of fiberglass to PVC-containing compositions in weight amounts of less than about 20% had little or no advantage in the resulting composite's strength beyond that of less expensive fillers such as wood or talc.

It has now been found that a relatively small amount, for example, less than about 20% by weight, or less than about 15% by weight, or less than about 12% by weight, or less than about 10% by weight, or less than about 8% by weight, or less than about 5% by weight, of a chopped fiberglass component, for example, fiberglass strand and/or mat, in the composite members of the present invention at least assists in providing or provides a significant, even synergistic, increase in strength to the present composite members, for example, relative to identical composite members without the chopped fiberglass component being present, or to an otherwise identical foamed composite member lacking the fiberglass component but containing other conventional fillers at the same percentage by weight as that of the reference fiberglass-containing component. Particularly surprising is that the strength of the foamed composite members of the present invention is particularly increased relative to an otherwise identical foamed composite member lacking the fiberglass component. This benefit of the presence of the chopped fiberglass component advantageously occurs or is provided in composite members that are substantially free or free of carpet waste.

In one example, the chopped fiberglass component is present in an amount less than about 15% by weight of the composite member. In another example, the chopped fiberglass component is present in an amount less than about 10% by weight of the composite member. Benefits, for example, increased strength, may be provided to composite members in accordance with the present invention including as little as about 2% by weight, or even about 1% or less, by weight, of the chopped fiberglass component.

The polyvinyl chloride (PVC) component of the present composite members may be any suitable such component. The term "polyvinyl chloride" is well known and understood in the polymer processing and use arts.

In some examples, the composite members of the present invention are uncapped. In other examples, the composite members of the present invention may further comprise a weatherable cap or cover component, covering at least a portion of the composite member. In one example, the cap or cap component is deposited on the composite member after the composite member (that is, the foamed composite member without the cap) is formed. In one example, the cap may comprise a polyester film (such as MYLAR®) or an acrylic composition wrapped around or glued or fused to the composite member. In other examples, the cap may be co-extruded with the composite member, which is preferably foamed. The cap may be provided to alter or change the outer surface, for example, the color or texture of the outer surface, of the composite member. The cap may be made of the same material as the rest of the composite member, or may be made of a different material, as the case may be. The cap may be, and in preferred examples is made of unfoamed material. In one example, the cap and the other components of the composite member may be, and preferably are, sufficiently compatible so that the cap remains in place on the composite member for substantially the entire useful life of the composite member. In preferred examples the cap component does not contain a fiberglass component.

In one example, the cap is not foamed and has substantially the same composition as the remainder of the composite member. In another example, the cap includes substantially no chopped fiberglass component. Preferably the cap has a thickness of about 1/8" or less, or about 1/32" or less. In some examples, such as certain blind components, the cap may have a thickness of about 8 to about 10 thousandths of an inch.

For some examples, for example, certain deck board components, the cap may have a thickness of from about 20 to about 30 thousandths of an inch.

The composite member may include hollow microspheres comprising a blowing agent component, for example, coated hollow microspheres as disclosed in Campese et al U.S. Patent Publication No. 2003/0198780. In one example, the composite member is substantially free of hollow microspheres.

In one example, the composite member may further comprise one or more other polymeric components, for example, a second polymeric component, in addition to the PVC component. For example, the second polymeric component may be present in the composite member in an amount less than the amount of the PVC component present in the composite member.

Examples of other polymeric components that may be used, in some examples, with the PVC thermopolymer include polymers made, at least in part, from other ethylenically unsaturated olefinic monomers including without limitation: monoolefinic hydrocarbons, i.e. monomers containing substantially only carbon and hydrogen, including such materials as ethylcellulose, 3-methylbutene-1,4-methylpentene-1, pentene-1,3,3-dimethylbutene-1,4,4-dimethylbutene-1, octene-1, decene-1, and the like.

The polymeric component or components preferably have an inherent viscosity of about 0.55 to about 1.05; preferably about 0.72 to about 0.74. The present composite members may include one or more filler components other than fiberglass. In one example, the composite member is substantially free of any wood component.

As noted above, the present composite members include chopped fiberglass component. The chopped fiberglass component may be selected from chopped fiberglass mat chopped fiberglass strands and mixtures thereof. Chopped fiberglass mat is a well-known and readily available material. In one example, the chopped fiberglass strand or mat (CFM) included in the present composite members may be provided in suitably sized particles so as to provide substantially the same strength benefit to the entire composite member. In one example, the CFM's provide substantially homogeneously throughout the present composite members. Such CFM may be chopped to about 1/4" to about 1/8" in length. The chopped fiberglass component may be mixed, or otherwise combined, with the filler components if any of the composite member precursor mixture so that the precursor mixture is substantially homogeneous. The sum of the weight percentages of CFM and filler components preferably does not exceed about 20% or about 40% by weight of the composition.

The amount of CFM in the composites of the present invention is about 20% by weight or less of the composite member. The amount of CFM may be about 10% by weight or less or about 5% by weight or less or about 2% by weight or less of the composite member.

The CFM in these concentration ranges has been advantageously shown to increase the strength of the composite member, for example, relative to the composite member without the CFM.

In addition, the relatively small amounts of CFM required to provide such increases in strength in the compositions, as set forth herein, has been found to be substantially not harmful to processing machinery producing the composite members, unlike higher percentages thereof.

Furthermore, the relatively small amounts of CFM required to provide such increases in strength, as set forth herein, surprisingly now make the use of a fiberglass component in accordance with the present invention a cost-effective way to provide added strength to the HDPE-containing compositions set forth herein.

In one example, the CFM component contains an intrinsic coupling agent, so that the composition requires no added coupling agent.

In one example, a composite member in accordance with the present invention comprises about 60% to about 98%, by weight, preferably about 70% to about 95%, of polyvinyl chloride (PVC). The PVC component may have a density of at least about 1.35 gm/cc to about 1.45 m/cc, or preferably about 1.4 gm/cc. The PVC component may have an inherent viscosity of from about 0.55 to about 1.05, or about 0.72 to about 0.74.

A foaming component may be included in the precursor composition of the composite member to provide the desired degree of foaming of the composite member. In some examples, the foaming agent may comprise a gas at least partly dissolved or sequestered in the compositions of the present invention. Often chemical foaming agents (CFAs) are used, either alone or in conjunction with a physical blowing agent, such as an inert gas. CFAs may be in powered form, in liquid form, or provided in pelletized form.

In some examples, an endothermic CFA capable of liberating a gas during extrusion may be used. Endothermic chemical foaming agents are chemicals that utilize energy from the extrusion process and consume heat in the chemical reaction. Typically an endothermic CFA may liberate $CO_2$ during the manufacturing process. This produces foams with a much smaller cell structure, resulting in improved appearance and better physical properties. HDPE-compatible endothermic chemical foaming agents (CFAs) are well-known and include endothermic CFAs made by, for example, Endex International, Dow Chemical Co., Clarient (which utilizes a CFA comprising sodium bicarbonate and citric acid).

In some examples, exothermic CFAs may be used. Exothermic CFAs generate heat during the decomposition process. They liberate more gas (generally N2) per gram of foaming agent than endothermic agents and generate a higher gas pressure. Examples of HDPE-compatible exothermic CFAs include, without, limitation, XO-279, XO-339 (Bergen International). HDPE-compatible exothermic chemical foaming agents (CFAs) are well-known and may also include exothermic CFAs made by, for example, Endex International, Dow Chemical Co. and Clarient. Some exothermic CFAs may comprise hydrazines and azo compounds. In some examples a combination of an endothermic and an exothermic foaming agent may be used.

CFAs may be combined with the other ingredients of the compositions to be formed as profiles in accordance with some aspects of the present invention, and thereafter made into a form useful for the manufacturing process to be selected; for example, the compositions may be pelletized for use in a thermoplastic extrusion process.

In some examples, a physical blowing agent gas, such as $CO_2$ gas, pentane, or nitrogen gas may be injected into the plastic melt during the extrusion process, either alone, or in conjunction with a chemical foaming agent added, for example, as a nucleation aid.

In some examples, an encapsulated foaming component may be used. In one example, the encapsulated foaming component comprises small particles, for example, foaming component microparticles, such as foaming component microspheres and the like. In one example, the encapsulated foaming component may comprise an encapsulating component and a blowing agent. See Wycech, U.S. Pat. No. 4,769,391 and see Melber et al, U.S. Pat. No. 4,843,104. The disclosure of each of these two patents is incorporated in its entirety herein by reference. Other encapsulated CFAs which may be used in the present composites, such as those made by Akzo-NobelExpancel, are well known in the art.

In some examples, the encapsulating component may comprise a polymer component, which may include one or a variety of polymers. These polymers may include, for example, ethylene/vinyl acetate, polyvinylidene chloride, polyacrylonitrile, poly-alkyl methacrylates, polystyrene and mixtures thereof. In one embodiment, the encapsulating component may comprise a copolymer. In one embodiment, the encapsulating component comprises a copolymer of ethylene/vinyl acetate.

A wide variety of blowing agents may be employed in an encapsulated foaming component. In one embodiment, the blowing agent comprises at least one hydrocarbon. For example, blowing agents useful in this invention include at least one saturated aliphatic hydrocarbon having about 3 carbon atoms to about 8 carbon atoms per molecule. For example, lower alkanes including propane, butane, pentane (e.g., isopentane) and the like, and mixtures thereof are very useful. See Melber et al, and Wycech, cited above.

In unexpanded form, the encapsulated foaming component may be made in a variety of sizes, those readily available in commerce being most often on the order of about 2 microns to about 20 microns, for example, about 3 microns to about 10 microns. It is possible to make encapsulated foaming component in a wider range of sizes. It has been demonstrated, for example, that encapsulated foaming components can be made from as small as about 0.1 micron, up to as large as about 1 millimeter, in diameter, before expansion.

An example of an encapsulated foaming component useful for this invention is sold by Expancel of Sundsvall, Sweden under the trade name Expancel 092 MB 120. This encapsulated foaming component comprises a ethylene/vinyl acetate encapsulating component and isopentane blowing agent.

In some examples, the encapsulated foaming component may be uniformly distributed in the composite member precursor composition to allow for a uniform distribution of density in the article formed from the composition. In other examples, the concentration of the encapsulated foaming component is not uniformly distributed to allow for some regions of the article formed by the composition to be more or less dense than other regions.

In some preferred examples an encapsulated foaming component is not used.

Further ingredients may include fillers other than wood, or in addition to wood. Additional fillers may include inorganic fillers such as talc, carbon fibers, mica, kaolin, calcium carbonate and the like. Organic fillers may include polymeric fiber and cellulose based fillers (such as coir, hemp, husks and the like) other than wood.

The compositions of the present invention may contain a lubricant, for example, as an extrusion aid. Various types of lubricant can be used, such as silicone oil, waxes, fatty acids, etc. Light mineral oil is commonly used as a lubricant; additional lubricants may include a hydrocarbon- and/or silicone-based oil or wax; such waxes may include a multilub. One or more lubricant can be added. Ester wax (up to about 1.2 parts per hundred by weight) is a particularly helpful lubricant in formulations lacking wood, while bistearamid wax (up to about 3.5 parts per hundred by weight) is particularly helpful in formulations containing wood. Ester wax and oxidized polyethylene (OPE) wax may also be used at suitable concentrations. In some examples, OPE wax may be used at a concentration of about 0.2 to about 0.4 parts per hundred by weight.

Extrusion processing aids suitable for use with PVC may also be used, such as (without limitation) methylmethacrylate processing aids and high molecular weight (HMW) methylmethacrylate processing aids. Additionally or alternatively, lubricating process aids containing oils or waxes can also be used, such as a methylmethacrylate processing aid containing an external wax. Such processing aids may be used at concentrations up to about 8 parts per hundred or so; for example, about 2 parts per hundred of a methylmethacrylate lubricating process aid can be used with about 4 to about 6 parts per hundred of a HMW methylmethacrylate process aid.

The compositions of the present invention may comprise one or more additional ingredients, such as (without limitation) antioxidants, light stabilizers, heat stabilizers, nucleating agents, and/or colorants.

In one example of the present invention, compositions are provided which comprise substantially uniform blends, including powders and pellets, comprising a PVC component, a chemical foaming agent, and a chopped fiberglass component (CFM), such as a chopped fiberglass mat component. In other examples, compositions are provided which comprise substantially uniform blends, including powders and pellets, comprising a PVC component and a chemical foaming agent, wherein a chopped fiberglass component (CFM) is added to the melt prior to the final extrusion of the profile through the extrusion die.

The following non-limiting examples illustrate some of the aspects and advantages of the present invention.

Examples 1 and 2

The following formulations are prepared by combining the listed ingredients; ingredients are listed as parts per hundred, with reference to the weight of polyvinyl chloride; the parts of any ingredient divided by the sum total of parts of all ingredients yields the weight percent if such ingredient:

| | Example 1 parts/100 | Example 2 parts/100 |
|---|---|---|
| Polyvinyl chloride (PVC)[1] | 100.0 | 100.0 |
| Methyltin mercaptide (12%)[2] | 1.5 | 1.5 |
| Calcium stearate (low dust)[3] | 0.8 | 0.8 |
| Paraffin wax (165 melt) | 0.4 | 0.4 |
| Ester wax | 1.2 | 0.0 |
| Bistearamid wax | 0.0 | 3.5 |
| OPE wax | 0.2 | 0.4 |
| HMW acrylic process aid[4] | 4.0 | 6.0 |
| Chlorinated polyethylene | 2.0 | 3.0 |
| Acrylic lubricating process aid[5] | 2.0 | 2.0 |
| Talc, 7-10 micron | 12.0 | 5.0 |
| CaCO$_3$, 0.75 micron | 8.0 | 5.0 |
| Wood Flour (60-100 mesh) | 0.0 | 35.0 |
| Chopped fiberglass (CFM); ⅛" | 10.0 | 15.0 |
| Foaming agent (CFA)[6] | 0.5 | 0.65 |

[1]PVC resin, 0.72 intrinsic viscosity.
[2]12% solution; stabilizer.
[3]lubricant/fusion aid
[4]methylmethacrylate plus external wax; lubricant/fusion aid.
[5]mixture of endothermic and exothermic CFAs.

Each of these formulations of Examples 1 to 2 is thoroughly dry mixed at temperatures of about 200° F. to about 240° F. (the melt temperature of the mixture is about 350° F. to about 375° F.) to form a substantially uniform, extrudable composition.

Examples 3 to 4

Each of the samples that is produced in Examples 1 and 2 is successfully formed into fused pellets using a Cincinnati Milacron Model CM-80 conical twin screw extruder and a Beringer Water Ring Pelletizer. In each, the following conditions are employed.

| | |
|---|---|
| Barrel Zone 1 | 325° F. |
| Barrel Zone 2 | 325° F. |
| Barrel Zone 3 | 345° F. |
| Barrel Zone 4 | 350° F. |
| Adaptor Zone 1 | 330° F. |
| Adaptor Zone 2 | 330° F. |
| Die Zone 4 | 350° F. |
| Die Zone 5 | 350° F. |
| Screw Oil | 300° F. |
| Motor, RPM | 2000 |
| Motor Load, amps | 110 |

Alternatively, each of the samples that is produced in Examples 1 and 2 is successfully formed into compacted pellets using a 3000 Series pellet mill (California Pellet Mill). In each case, the ingredients are continuous mixed during pelleting to prevent the chopped glass from becoming separated before the pellets are formed. The pellet mill presses and compacts the ingredients together with no applied heat, and a minimum of resulting heat from friction.

In either case, the resulting pellets are useful for shipment, storage, or for immediately use in an extrusion process.

Examples 5 to 6

A sample of the pellets produced in each of Examples 3-4 is placed in a Cincinnati Milacron Model CM-80 conical twin-screw extruder.

The foamable composition is permitted to react to become a foamed composition; the temperature and/or pressure in the extruder is carefully controlled to induce foaming to an appropriate degree and at an appropriate time and place during the extrusion process. Alternatively, the foaming agent may be left out of the formulation and added to the melt during the extrusion process.

The foamable composition is permitted to react to become a foamed composition, in the form of a composite in the shape of a rail baluster element 12, shown in FIG. 1. Additionally, another portion of a coextruded composition, lacking the foaming component, is present on the rail baluster element as a cap 14 on the outer surface of the rail baluster element. The capped rail baluster element is a rail baluster 16 and is useful as such. See, for example, U.S. Pat. Nos. 6,054,207; 5,518, 677; 4,769,391; and 4,722,943.

The rail baluster 16 is subjected to a stiffness test for use as a rail element and found to pass such tests. The rail baluster has sufficient strength and weatherability to be used out-of-doors on a long-term basis.

Examples 7-8

Similar processing to that set forth in Examples 5-6 may be used to produce decking element 22 and capped decking element 20, which includes a cap 24, and is a decking slat 26 and is useful as such.

The decking slat 26 is found to have a sufficient strength and weatherability to be used out-of-doors on a long term basis.

Examples 9-10

Additionally, similar processing to that set forth in Examples 5-6 may be used to produce window covering element 32 and a cap 34 on the window covering element 32 which together are capped window covering element 36, and which is useful as such.

The uncapped window covering element 32 and the capped window covering element 36 thus produced are found to have sufficient strength and weatherability to be used out-of-doors or on windows exposed to direct sunlight on a long term basis.

Example 16

A composition is made using the formulation of Example 2, but without the added fiberglass component. This composition is pelleted as set forth in Examples 4-6, and then used as the thermoplastic component in the extrusion process set forth in Examples 7-9. The same amount of the fiberglass component is added to the plastic melt before the foaming step, and the resulting composition is then formed into a foamed profile. This profile is found to have substantially similar strength characteristics as an identical profile made using the formulation of Example 2, in which the glass is added before pelleting.

Example 17

A composition is made using the formulation of Example 2, but without the added foaming component. This composition is pelleted as set forth in Examples 3-4, and then used as the thermoplastic component in the extrusion process set forth in Examples 5-6. The same amount of the foaming component is added to the plastic melt before the foaming step, and the resulting composition is then formed into a foamed profile. This profile is found to have substantially similar strength characteristics as identical profiles made using the formulation of Example 2 or made using the method of Example 16.

A number of patents have been cited herein. The disclosure of each of these patents is incorporated in its entirety herein by reference.

While this invention has been described with respect to various specific examples and embodiments, it is to be understood that the invention is not limited thereto and that it can be variously practiced within the scope of the following claims.

What is claimed is:

1. A composite member comprising
a substantially homogenous foamed composition comprising
   a) a polyvinyl chloride;
   b) a chopped fiberglass component present in an amount greater than 0% and less than about 15% by weight of the composition, and dispersed in random orientations within the polyvinyl chloride in fragments from about ⅛ inches to about ¼ inches, wherein the chopped fiberglass fragments are obtained by chopping a chopped fiberglass mat that is comprised of glass fibers treated with a silane coupling agent and said treated glass fibers laid randomly across one another and held together with a binder;
   c) a talc component; and
   d) a calcium carbonate component;
wherein the composite member is substantially free of carpet waste; the sum of the weight percentages of said calcium carbonate component, talc component, and chopped fiberglass component is about 25%; and the presence of the chopped fiberglass component is effective to increase the strength of the composite member as compared to an otherwise identically produced composite member in which the chopped fiberglass component present in the composite member is substituted with the calcium carbonate component, the talc component, or a mixture of the calcium carbonate component and the talc component in the otherwise identically produced composite member on a weight percentage basis.

2. The composite member of claim 1 in a form selected from the group consisting of a deck element, a window blind element and a rail element.

3. The composite member of claim 1 wherein the chopped fiberglass component is present in an amount greater than 0% and less than about 10% by weight of the composite member.

4. The composite member of claim 1 which further comprises a cap covering at least a portion of the composite member.

5. The composite member of claim 4 wherein the cap includes substantially no chopped fiberglass component.

6. The composite member of claim 1 wherein the chopped fiberglass component is present in an amount of about 3% by weight of the composite member.

7. The composite member of claim 1 wherein the polyvinyl chloride has an inherent viscosity of between about 0.55 and about 1.05.

8. The composite member of claim 7 wherein the polyvinyl chloride has an inherent viscosity of between about 0.72 and about 0.74.

9. The composite member of claim 1 which is substantially free of hollow microspheres.

10. The composite member of claim 1 which is substantially free of a wood component.

11. The composite member of claim 1 in a form of a deck element.

12. The composite member of claim 1 in the form of a window blind element.

13. The composite member of claim 1 in the form of an element of a rail system.

14. A deck comprising a plurality of composite members of claim 1.

15. A window blind comprising a plurality of composite members of claim 1.

16. A rail system comprising a plurality of composite members of claim 1.

* * * * *